April 21, 1936.     R. F. KOHR     2,038,224
BRAKE
Original Filed June 30, 1930    2 Sheets-Sheet 1
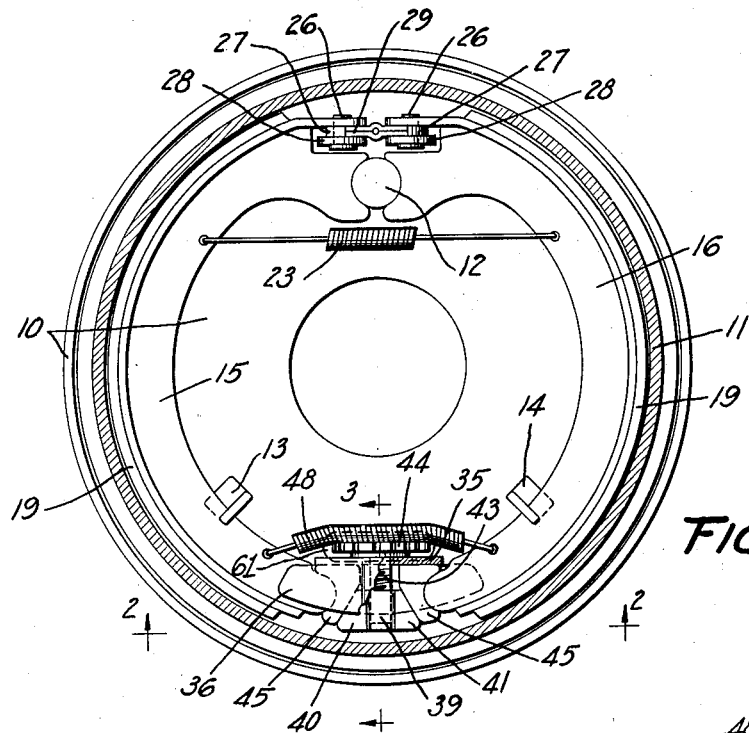
FIG.1
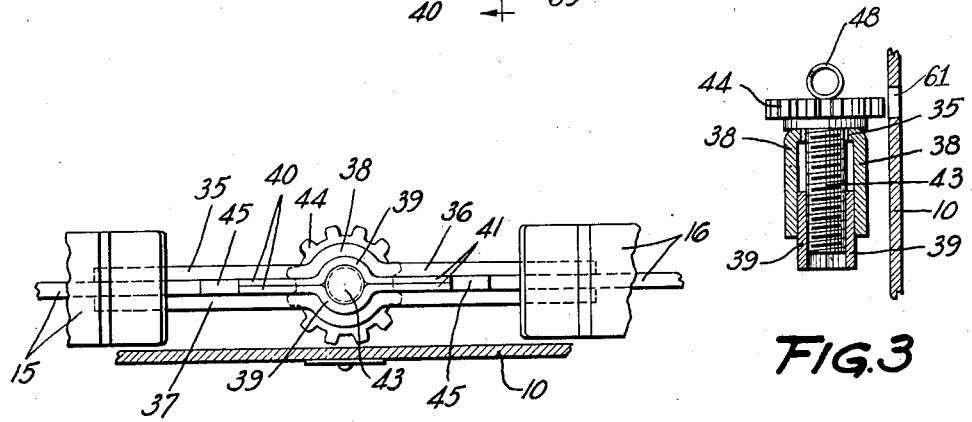
FIG.2
FIG.3
INVENTOR.
ROBERT F. KOHR
BY
ATTORNEY April 21, 1936.  R. F. KOHR  2,038,224
BRAKE
Original Filed June 30, 1930   2 Sheets-Sheet 2

INVENTOR.
ROBERT F. KOHR
BY
ATTORNEY

Patented Apr. 21, 1936

2,038,224

UNITED STATES PATENT OFFICE 2,038,224

BRAKE

Robert F. Kohr, South Bend, Ind., assignor to Bendix Brake Company, South Bend, Ind., a corporation of Illinois Original application June 30, 1930, Serial No. 464,730. Divided and this application April 4, 1934, Serial No. 718,960

12 Claims. (Cl. 188—79.5)

This invention relates to brakes, and is illustrated as embodied in an internal expanding automobile brake of the shiftable anchorage type.

An object of the invention is to provide a simple and inexpensive but effective wear adjustment for the brake, which is easily operated and which preferably is made mainly of steel stampings.

In one desirable arrangement, a threaded member (which may be operated through an opening in the backing plate) is arranged to shift a wedge, which preferably is formed as a stamped part, and which spreads apart two sections or shoes of the friction means to make the desired adjustment. This wedge may have a central sleeve formed therein, threaded or otherwise formed to engage and receive the operating member.

In one of the illustrated embodiments, the wedge moves radially of the brake, and engages correspondingly-shaped surfaces on two other parts (shown as steel stampings) formed with sockets pivotally receiving the rounded ends of the shoes.

In the other illustrated embodiment, the wedge moves perpendicularly toward the backing plate, and engages directly against beveled surfaces on two sections or shoes of a band which forms the friction means of the brake.

According to one feature of the invention, the wedge or its equivalent is guided by means carried by the shoe ends of the friction means, and which preferably is a clip embracing those ends, and which is conveniently formed as a steel stamping doubled over to form the described clip.

The clip preferably is formed with registering grooves which provide a guide sleeve for the inner sleeve of the wedge, with the side wings of the wedge guided between the two sides of the clip. The clip also embraces the ends of the shoes or sections of the friction means and, in the first embodiment, the socketed members in which the shoe ends are pivoted.

The above and other objects and features of the invention, including various novel combinations of parts and desirable particular constructions, will be apparent from the following description of the illustrative embodiments shown in the accompanying drawings, in which:

Figure 1 is a vertical section through the first embodiment, just inside the head of the brake drum, and showing the brake shoes in side elevation;

Figure 2 is a partial section on the line 2—2 of Figure 1, showing the adjustment in bottom plan view;

Figure 3 is a partial section through the adjustment, on the line 3—3 of Figure 1;

Figure 4:
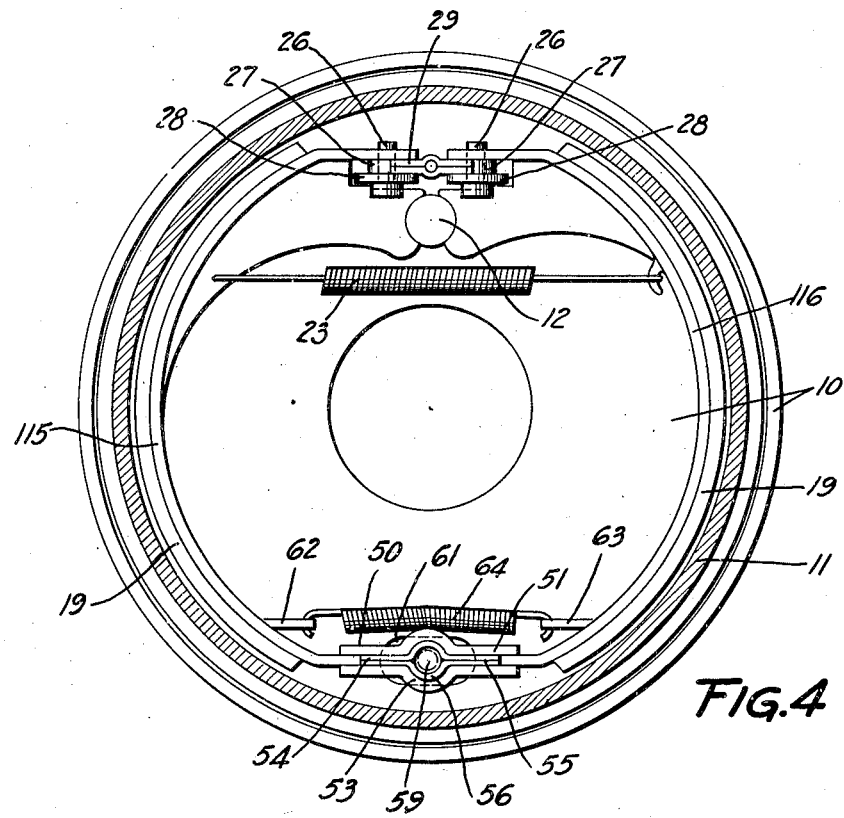
Figure 4 is a section through the second embodiment, corresponding to Figure 1.

The brake illustrated in Figure 1 includes a support such as a backing plate 10, arranged at the open side of a drum 11 rotatably carried by the wheel, and with the drum forming a substantially closed brake chamber housing the friction means of the brake. The backing plate 10 may carry a stationary post or other anchorage 12, and suitable positioning devices 13 and 14.

The friction means of Figure 1 includes primary and secondary T-section shoes 15 and 16, each formed with a rim and a web, which may if desired be formed separately and welded or otherwise secured together. The shoes are faced with any suitable brake lining 19. The upper ends of the shoe webs are notched to embrace the anchor 12, against which they are held when released by a return spring 23. The illustrated shoes are interchangeable with each other, being exactly alike.

The upper ends of the shoes are provided with means such as pairs of rollers 27 and 28 mounted on pins 26 carried by the ends of the shoe rims above the anchor 12. The smaller rollers 27 embrace an operating device such as a wedge 29 moving in a direction perpendicular to the backing plate and operated by means such as a cable-and-conduit "Bowden"-type control (not shown). The illustrated wedge is built up by welding two stampings together. Rollers 28 hold the wedge in place and also have rolling engagement with the backing plate 10, thereby taking tne thrust of the wedge toward the backing plate.

The above-described applying and anchorage means is claimed in my copending parent application No. 464,730, filed June 30, 1930, from which the present application is divided.

Whether or not the above-described applying and anchorage means is used, I prefer to connect the lower ends of the shoes or their equivalents by a novel adjustment which forms the subject-matter of the present application. In the embodiment illustrated in Figures 1–3, this novel adjustment includes a clip or envelope formed as a doubled-over stamping 35, the right-hand portion of which is broken away in Figure 1 to show the end of the web of the shoe.

This envelope has parallel side portions 36 and 37, embracing the ends of the shoe webs between them, and having registering central semi-cylindrical grooves forming a central tubular portion or sleeve 38.

Movably held in place between the sides 36 and 37 of this envelope is a spreading device such as a wedge, preferably formed by spot-welding or otherwise securing together two stampings having registering semi-cylindrical grooves forming a cylindrical central sleeve or socket portion 39 and flanges or side wings 40 and 41.

These wings 40 and 41 are formed with oppositely inclined edges, to form the desired wedge surfaces, and the central socket 39 is internally threaded or otherwise formed to receive an operating member such as a screw 43 having a toothed head 44 engaging the top of the envelope 35.

Stampings or the like 45 held between the sides 36 and 37 are formed on their inner sides with inclined wedge surfaces engaged by the wedge described above, and on their outer sides with semi-circular notches pivotally receiving the rounded ends of the webs of the shoes.

The shoes are held yieldingly in engagement with the adjustment, and the parts of the adjustment are held together, by means such as a spring 48 tensioned between the shoes and tensioned over the head 44 to hold it frictionally in adjusted position.

To adjust the brake, it is only necessary to pass a suitable tool through an opening 61 in the backing plate, and turn the head 44 to draw the wedge 39—41 radially upward.

Figure 5:
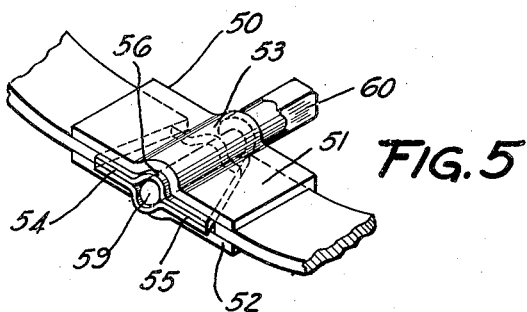
Figure 5 is a perspective view of the ends of the band sections of Figure 4, with the connecting adjustment.

In the arrangement of Figures 4 and 5, the shoes or sections 115 and 116 are flexible bands, suitably reinforced by short webs at their upper ends only, and the lower ends of which are received in an envelope or clip 50 having parallel sides 51 and 52. These sides are formed with registering semi-cylindrical grooves providing a horizontal sleeve 53 corresponding to the vertical sleeve 39 in the first modification.

In this embodiment the operating device is shown as a wedge made by spot-welding together two stampings or the like 54 and 55. These stampings have registering central semi-cylindrical grooves forming an inner sleeve 56 fitting within the sleeve 53, together with side wings having oppositely-inclined edges forming the wedge proper and engaging corresponding inclined wedge surfaces on the ends of the sections 115 and 116.

The central sleeve or socket 56 is internally threaded or otherwise formed operatively to receive an operating device such as a horizontal screw 59 having a square head 60 seated against the envelope or clip 50 and accessible through an opening 61 in the backing plate. The parts may be held together by a spring 64 tensioned between lugs 62 and 63 struck up from the sections 115 and 116.

In this case, turning the screw 59 draws the wedge 54—56 horizontally toward the backing plate to force the sections 115 and 116 apart to make the desired adjustments.

While two illustrative embodiments have been described in detail, it is not my intention to limit the scope of the invention to those particular embodiments, or otherwise than by the terms of the appended claims.

I claim:

1. A brake comprising an adjustable member including a stamping bent upon itself to provide a clip having a sleeve formed with slots in its opposite sides, a member positioned for movement in the sleeve having flanges extending through said slots and slidable in the clip, and a screw for actuating the member in the sleeve.

2. A brake comprising an expansible member including an envelope having a transverse sleeve having slots in its sides, a member positioned for movement in the sleeve comprising two stampings having semi-cylindrical grooves secured together with the grooves in registry and having flanges on the movable member extending through said slots and slidable in the envelope, and means for adjusting the movable member including an adjusting bolt received in the registering grooves.

3. A brake comprising an expansible member including a stamping bent upon itself to provide a clip having a transverse split sleeve, a member slidable in the split sleeve having flanges slidable in the clip comprising two stampings formed with semi-cylindrical grooves and secured together with said grooves in registry, and means for moving the member within the clip including an adjusting member engaging the end of the clip and threaded into the registering grooves.

4. A brake comprising a backing plate, a friction element positioned on the backing plate having its articulated ends bevelled in opposite directions, a stamping bent upon itself to envelop the bevelled ends of the friction element, a split sleeve formed in the stamping, a member movable in the sleeve comprising two stampings having flanges with bevelled edges engaging the bevelled ends of the friction element and formed with grooves and secured together with the grooves in registry, and means for moving the member including an adjusting device passing into said registering grooves.

5. A brake comprising a fixed support, friction elements positioned for movement on the support having their articulated ends bevelled in opposite directions, a stamping bent upon itself to envelop the ends of the friction element, a split sleeve formed in the stamping, a sleeve having radial flanges positioned for movement in the split sleeve on the stamping with its flanges engaging the bevelled ends of the friction element, and a screw for moving the member having a head seated against said stamping and having its end threaded into said sleeve which has the radial flanges.

6. A brake comprising a fixed support, a friction element positioned for movement on the support having its articulated ends bevelled in opposite directions, a stamping bent upon itself to envelop the ends of the friction element, a split sleeve formed in the stamping, a member positioned for movement in the sleeve having flanges slidable in the envelope between the two parts of the split sleeve in engagement with the bevelled ends of the friction element and means for moving the element.

7. A brake comprising a fixed support, a friction element positioned for movement on the support and having its articulated ends rounded, a stamping bent upon itself to provide a clip adapted to receive the rounded ends of the friction element, a split sleeve on the clip, a member positioned for movement in the sleeve having flanges slidable in the clip, members slidably positioned on the flanges having sockets adapted to receive the rounded ends of the friction element and means for adjusting the member including a screw and thumb nut.

8. An adjustment for a brake or the like comprising a movable wedge formed of two stampings having inclined edges and having registering semi-cylindrical grooves forming a socket intermediate the inclined edges which is internally threaded, and an operating device threaded into said socket, said inclined edges being formed on double thickness central wedge flanges on opposite sides of the socket.

9. An adjustment for a brake or the like comprising a wedge formed of two stampings having inclined edges and having registering semi-cylindrical grooves forming a socket intermediate the inclined edges which is internally threaded, said inclined edges being formed on double thickness central wedge flanges on opposite sides of the socket.

10. A brake comprising floating friction members, an envelope having spaced sides embracing the ends of said members and floating with and supported by said ends, a wedge device embraced between said sides and arranged between said ends, and operating means engaging the envelope and said wedge for moving the wedge to force said ends apart.

11. A brake comprising friction members having rounded ends, an envelope having spaced sides embracing the ends of said members, a wedge device embraced between said sides and arranged between said ends, operating means engaging the envelope and said wedge for moving the wedge to force said ends apart, and parts also embraced between said sides having inclined edges engaged by said wedge device and having sockets pivotally receiving said rounded ends.

12. An adjustment for a brake or the like comprising an envelope having spaced sides and a central sleeve portion, a wedge member embraced between said sides and having a sleeve portion fitting within the first sleeve portion, and operating means interengaging with said member inside said second sleeve portion and having a head engaging said envelope.

ROBERT F. KOHR.